C. F. RODIN.
SHOCK ABSORBER.
APPLICATION FILED APR. 20, 1921.
1,389,987.
Patented Sept. 6, 1921.
2 SHEETS—SHEET 1.
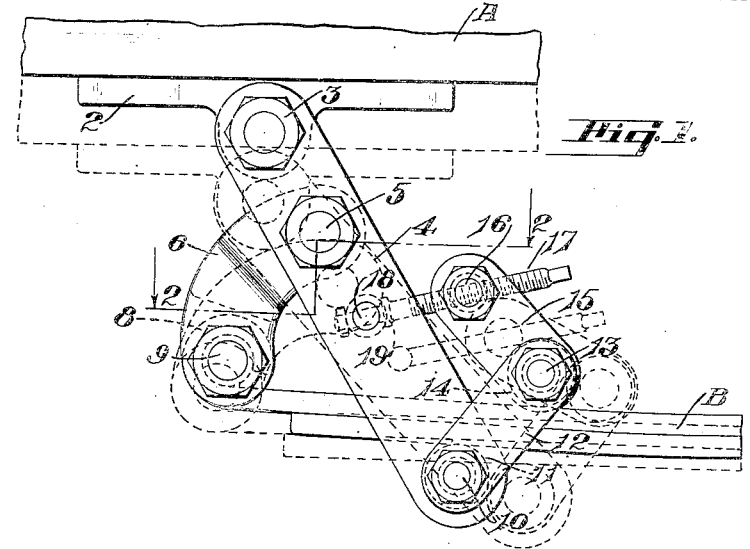
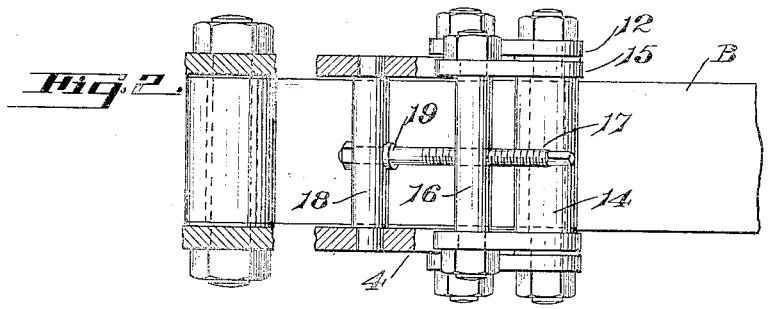
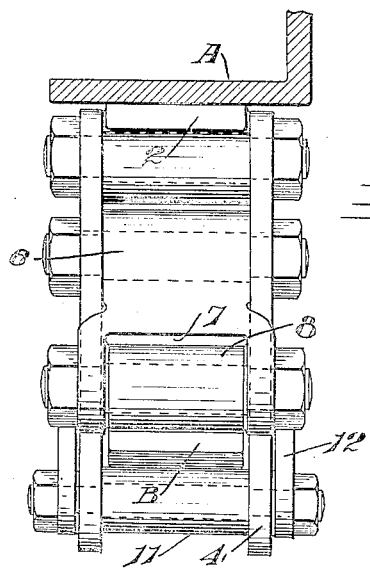
INVENTOR.
CHARLES F. RODIN.
BY Chas. E. Townsend
ATTORNEY.

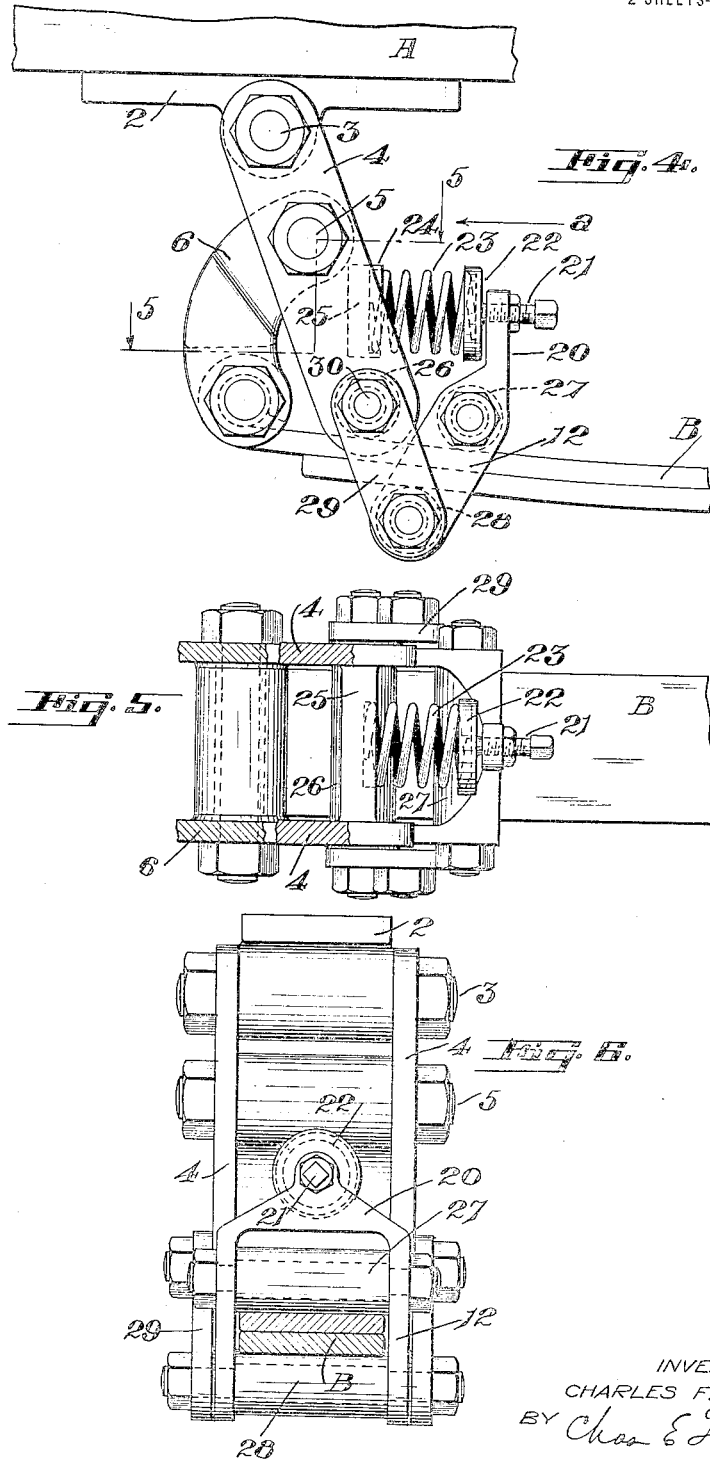

UNITED STATES PATENT OFFICE.

CHARLES F. RODIN, OF SAN FRANCISCO, CALIFORNIA, ASSIGNOR OF ONE-HALF TO JOHN ERIKSON, OF SAN FRANCISCO, CALIFORNIA.

SHOCK-ABSORBER.

1,389,987.  Specification of Letters Patent.  Patented Sept. 6, 1921.

Application filed April 20, 1921. Serial No. 462,941.

*To all whom it may concern:*

Be it known that I, CHARLES F. RODIN, a citizen of the United States, residing at the city and county of San Francisco, and State of California, have invented new and useful Improvements in Shock-Absorbers, of which the following is a specification.

This invention relates to a vehicle frame suspension device, and especially to means associated with the semi-elliptical spring of a vehicle for checking rebound movements.

One of the objects of the present invention is to generally improve and simplify shock absorbers of the character described, and especially to provide a link and lever mechanism which is adapted to be interposed between one end of a semi-elliptical spring and the vehicle frame, and which will permit free movement of the frame during compression of the spring, but will check the rebound movements.

Another object of the invention is to provide a device of the character described which is simple, strong and cheap to manufacture, and which may be applied to practically any vehicle as it will only be necessary to remove the spring shackle to apply the present device.

Further objects will hereinafter appear.

The invention consists of the parts and the construction, combination and arrangement of parts as hereinafter more fully described and claimed, having reference to the accompanying drawings, in which—

Figure 1 is a side elevation of the shock absorber showing it interposed between the main frame of a vehicle and the free end of a semi-elliptical spring.

Fig. 2 is a plan view in section taken on line 2—2, Fig. 1.

Fig. 3 is an end view of Fig. 1.

Fig. 4 shows another form of the shock absorber.

Fig. 5 is a plan view in section taken on line 5—5, Fig. 4.

Fig. 6 is an end view of Fig. 4 looking in the direction of arrow *a*.

Referring to the drawings in detail, and particularly to Fig. 1, A indicates the main frame of a motor vehicle, and B the free or shackle end of a semi-elliptical spring by which the main frame is supported. Secured to the underside of the frame is a bearing member 2, and extending therethrough is a bolt 3 upon which is pivotally mounted a pair of interspaced links 4. Pivotally mounted between said links on a pin 5 is a shackle member 6, the lower end of which is forked as at 7 to permit the eye 8 of the upper leaf of the elliptical spring to be attached to a pin 9 extending therethrough. The links 4 are fairly long and extend below the spring B. The lower ends are connected by a pin 10 upon which is mounted a roller 11, and the pin also serves as a support for a pair of links 12 which extend in an upward direction and which are connected by a pin 13, said pin in turn supporting a roller 14 and a pair of links 15, the upper ends of which are connected by a pin 16. The center portion of this pin is drilled and tapped and serves as a support for an adjusting screw 17, the inner end of which is turnably mounted and supported in a pin 18 secured between the links 4; the screw 17 being provided with a pair of collars 19 engaging the opposite sides of the pin 18 to secure the screw against endwise movement. The rollers 11 and 14 engage the opposite sides of the spring B and they are provided for the purpose of permitting a free movement of the vehicle frame with relation to the spring B during compression of said spring, and they also serve the function of frictionally engaging and biting the opposite sides of the springs when rebound movement takes place, thus checking this movement preventing excess rebounds.

Most individuals familiar with the action of elliptical springs are well aware of the fact that it is not compression of the springs which causes breaking or destruction of the same, but it is excess rebound movement of the vehicle frame in an upward direction which causes the average breakage. The present device has been particularly designed to obviate excess rebound movements and operates substantially as follows:

When a chuck-hole or other obstruction is encountered on the road, downward movement of the frame A and compression of the spring is permitted as the links 4 will swing forwardly to assume the dotted line position shown, while the shackle links 6 will swing rearwardly as indicated; no resistance being exerted by the rollers 11 and 14 during this movement as they roll freely along the upper and lower sides of the spring. The moment however that rebound movement starts, links 4 tend to swing backwardly, thus exerting a pull on the links 12, which causes the rollers 11 and 14 to frictionally engage and bite the springs. This bite or frictional engagement of course increases in proportion to the angles assumed by the several links and thus automatically checks not only excess rebound movements, but in fact any rebound movement which takes place. The frictional engagement or bite of the rollers may be adjusted to a large extent by the screw 17.

Turning movement of this screw tends to swing the links 15 so as to exert more or less pressure on the rollers 14. This adjustment is of considerable importance as it permits the frictional engagement of the rollers to be adjusted to suit varying sizes of vehicles or loads.

The device does not only serve as a rebound absorber or checker, but it also functions as a spring shackle. This is another important feature of the present invention as it permits the device to be applied to practically any vehicle. This will readily be understood when it is stated that it is only necessary to remove the old spring shackle when applying the present device.

In Fig. 4 another form of the invention is illustrated. In this instance I form an upwardly extending lug 20 on the links 12. This lug supports an adjusting screw 21, on the inner end of which is formed a cup 22. This cup serves as a support for a helical spring 23, the opposite end of which is supported in a cup 24 secured to a cross member 25 disposed between the main links 4. This device functions practically in the same manner as that illustrated in Fig. 1, the only difference being that three sets of rollers are employed as indicated at 26, 27 and 28; the roller 27 being disposed between the links 12; the roller 28 between a pair of supplemental links 29 pivotally attached to the links 4, as indicated at 30, and the roller 26 being supported by a pin 30. The tension of the spring 23 is such that the links 12 and 29 always have a tendency to separate. Such separation does not affect the forward movement of the links and rollers on the spring, but it materially checks retrograde movement, such as takes place when the vehicle is rebounding. The pressure or friction exerted by the rollers may be materially varied by adjusting the tension of the spring 23 by means of the screw 21.

While certain features of the present invention are more or less specifically illustrated, I wish it understood that various changes in form and proportion may be resorted to within the scope of the appended claims, similarly that the materials and finish of the several parts employed may be such as the experience and judgment of the manufacturer may dictate or varying uses may demand.

Having thus described my invention, what I claim and desire to secure by Letters Patent is—

1. The combination with a vehicle frame, of an axle supporting spring secured at one end to the frame, a pair of links pivotally attached to the frame adjacent the opposite end of the spring, a shackle link pivotally mounted between said links and connected with the spring, and means carried by the links and engageable with the spring, said means having a free sliding movement on the spring during compression of the same and frictionally clamping the spring during rebound movement.

2. The combination with a vehicle frame, of an axle supporting spring secured at one end to the frame, a pair of links pivotally attached to the frame adjacent the opposite end of the spring, a shackle link pivotally mounted between said links and connected with the spring, a pin secured between the lower ends of the links, a second pair of links pivotally mounted on said pin, a pin connecting the opposite ends of said second named links, and means carried by said last named pin and the pin connecting said links to the first named links, said means having a free sliding movement on the spring during compression of the same and frictionally clamping the spring during rebound movement.

3. The combination with a vehicle frame, of an axle supporting spring secured at one end to the frame, a pair of links pivotally attached to the frame adjacent the opposite end of the spring, a shackle link pivotally mounted between said links and connected with the spring, a pin secured between the lower ends of the links, a second pair of links pivotally mounted on said pin, a pin connecting the opposite ends of said second named links, means carried by said last named pin and the pin connecting said links to the first named links, said means having a free sliding movement on the spring during compression of the same and frictionally clamping the spring during rebound movement, and means interposed between the first named links and the second named links adapted to separate the same and exert a pressure upon the spring engaging means.

4. The combination with a vehicle frame, of an axle supporting spring secured at one end to the frame, a pair of links pivotally attached to the frame adjacent the opposite end of the spring, a shackle link pivotally mounted between said links and connected with the spring, a pin connecting the lower ends of the links, a roller journaled thereon and engageable with one side of the spring, a second pair of links pivotally mounted on said pin, a pin connecting the opposite ends of said second named links, a roller journaled on said last named pin, and means for exerting a pressure on said second named links which will cause the rollers to frictionally clamp the springs during rebound movement of the spring and vehicle frame.

5. The combination with a vehicle frame, of an axle supporting spring secured at one end to the frame, a pair of links pivotally attached to the frame adjacent the opposite end of the spring, a shackle link pivotally mounted between said links and connected with the spring, a pin connecting the lower ends of the links, a roller journaled thereon and engageable with one side of the spring, a second pair of links pivotally mounted on said pin, a pin connecting the opposite ends of said second named links, a roller journaled on said last named pin, means for exerting a pressure on said second named links which will cause the rollers to frictionally clamp the springs during rebound movement of the spring and vehicle frame, said means comprising a third pair of links pivotally attached to the second named links, a pin extending between said links, a pin connecting the first named links, and a screw turnably mounted in said pin and extending through a threaded opening formed in the pin supported by the third set of links.

6. In a device of the character described the combination with a vehicle frame, and a semi-elliptical spring secured at one end thereto, of a spring shackle pivotally attached to the opposite end of the spring, a pair of links pivotally attached to the vehicle frame, a pivotal connection between said links and the spring shackle, and means actuated by said links and the spring shackle, said means having a free sliding movement with relation to the spring during compression thereof and frictionally clamping the spring during rebound movement.

7. In a device of the character described the combination with a vehicle frame and a semi-elliptical spring secured at one end thereto, of a spring shackle pivotally attached to the opposite end of the spring, a pair of links pivotally attached to the vehicle frame, a pivotal connection between said links and the spring shackle, means actuated by said links and the spring shackle, said means having a free sliding movement with relation to the spring during compression thereof and frictionally clamping the spring during rebound movement, and adjustable means for increasing or decreasing the clamping pressure exerted.

CHARLES F. RODIN.